(No Model.) 2 Sheets—Sheet 2.
J. McCALLUM.
GRASS CLIPPING DEVICE.
No. 603,919. Patented May 10, 1898.
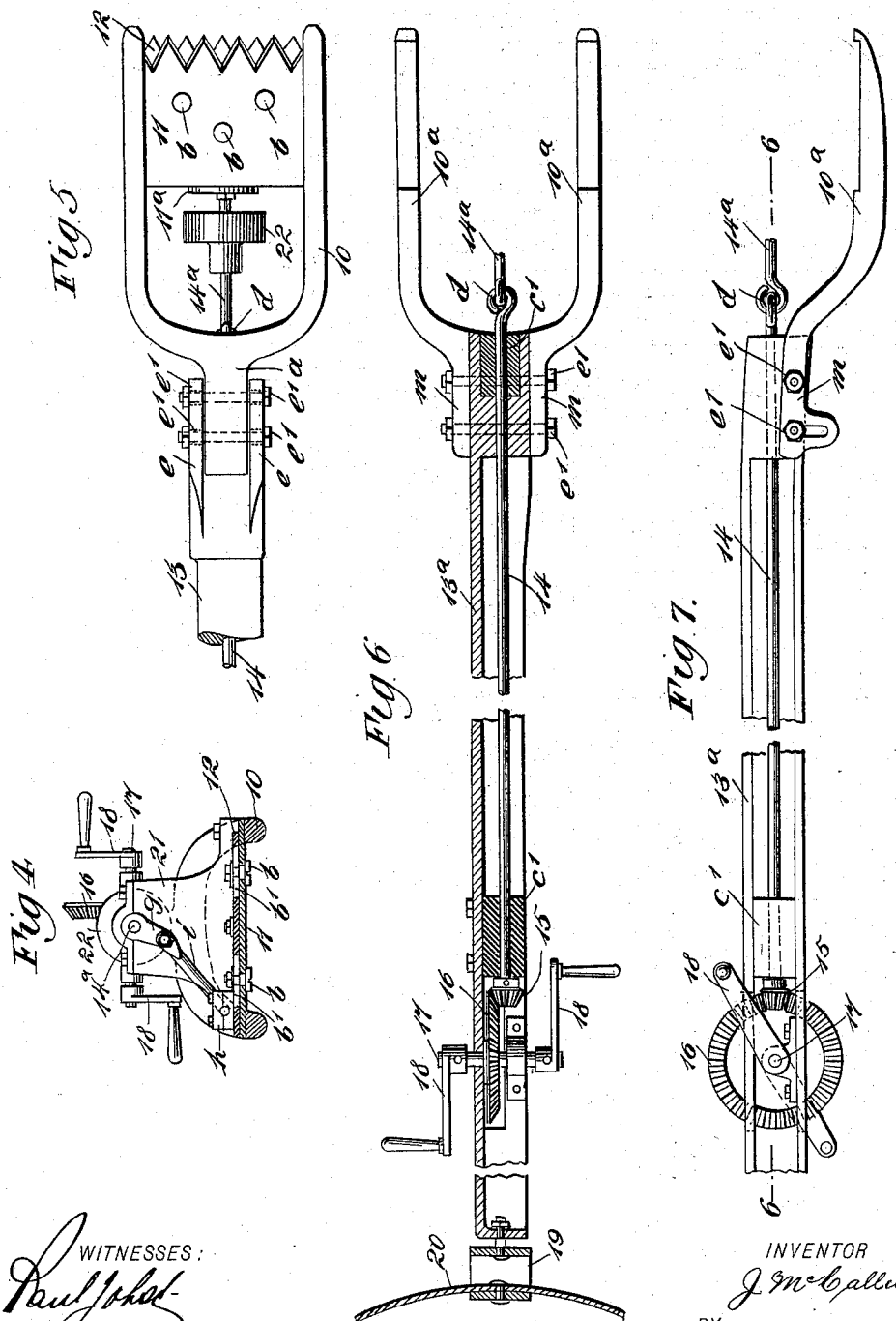
WITNESSES:
INVENTOR
J. McCallum.
BY
ATTORNEYS.

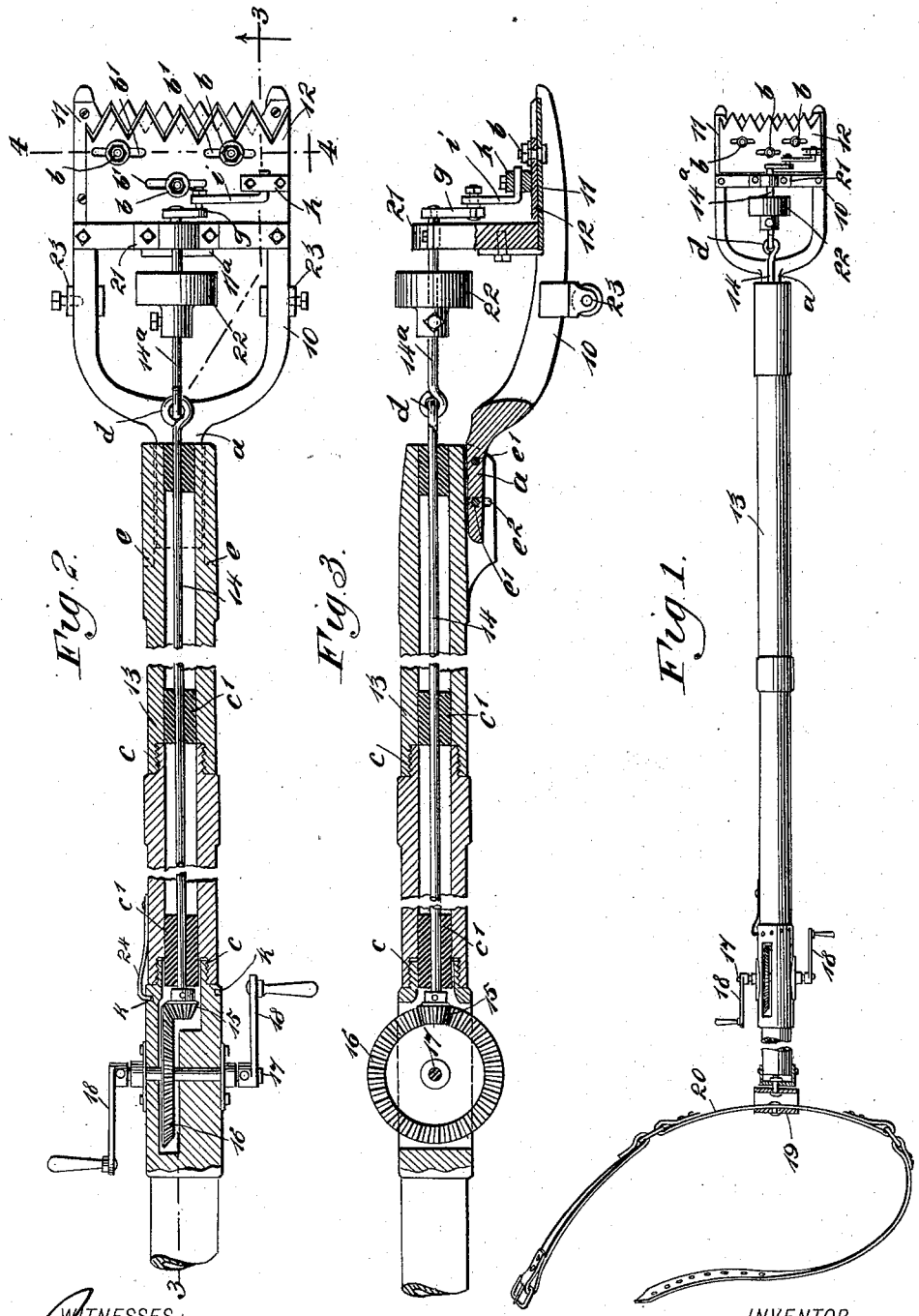

UNITED STATES PATENT OFFICE.

JOHN McCALLUM, OF CHIPPEWA FALLS, WISCONSIN.

GRASS-CLIPPING DEVICE.

SPECIFICATION forming part of Letters Patent No. 603,919, dated May 10, 1898.

Application filed February 17, 1897. Serial No. 623,794. (No model.)

*To all whom it may concern:*

Be it known that I, JOHN McCALLUM, of Chippewa Falls, in the county of Chippewa and State of Wisconsin, have invented a new and Improved Grass-Clipping Device, of which the following is a full, clear, and exact description.

This invention relates to a manually-operated grass-cutting machine, and has for its object to provide a novel, cheap, simple, and convenient device of the character indicated which is adapted for manipulation by one or both hands of the operator and that may be moved easily in any direction, so as to clip grass around trees or shrubbery or along borders of grass-beds, as may be desired.

The invention consists in the novel construction and combination of parts, as is hereinafter described, and indicated in the claims.

Reference is to be had to the accompanying drawings, forming a part of this specification, in which similar characters of reference indicate corresponding parts in all the figures.

Figure 1 is a broken plan view of the improved grass-clipping implement. Fig. 2 is an enlarged broken and partly-sectional plan view of the device shown in Fig. 1. Fig. 3 is a sectional side view of the implement shown in Figs. 1 and 2 substantially on the line 3 3 in Fig. 2. Fig. 4 is a transverse sectional view essentially on the line 4 4 in Fig. 2. Fig. 5 is a reverse plan view of the cutter-head and forward portion of the handle-bar shown in the previously-described figures. Fig. 6 is a broken partly-sectional plan view of a modified construction for the cutter-head frame and handle-bar, and Fig. 7 is a side view of the parts shown in Fig. 6.

The grass-clipping device, which is constructed as represented in Figs. 1 to 5, inclusive, will first be described. In this construction a cutter-head frame 10 is provided, which is in the form of a two-pronged fork, the spaced members of which are preferably formed integral with a shank $a$. On the head-frame members a transversely-disposed cutter-bar 11 is secured near its ends. On the cutter-bar 11 a substantially similar flat cutter-blade 12 is imposed and held to slide a limited distance longitudinally by the studs $b$, that project upwardly from the cutter-bar and loosely engage with the longitudinal slots $b'$, that are formed in the cutter-blade 12, washers and nuts on these shouldered studs serving to loosely secure the cutter-blade in place.

A series of similarly-sized V-shaped teeth is formed on the forward edge of the cutter-bar 11 and also on the cutter-blade 12, which will shear-cut grass or the like when such material is introduced between the teeth and the cutter-blade 12 is reciprocated.

The handle-bar 13, whereon the cutter-head frame 10 is held in position for use, as shown in Figs. 1 to 5, inclusive, is in the form of a tubular stock, which is preferably formed of sections that are screwed together at the meeting ends, whereby a hollow, light, and strong handle for the implement is afforded.

At the screw-joints $c$, where sections of the handle-bar 13 have a threaded connection with each other, axially perforated boxes $c'$ are inserted and secured in the hollow handle-sections. In the boxes $c'$ a shaft 14 is introduced and extends at its ends from the top and lower boxes a suitable distance. At the upper end of the shaft 14 a bevel-pinion 15 is secured thereon, which meshes with a larger bevel-gear 16, that is secured upon the driving-shaft 17, which is rotatably supported transversely on the upper section of the handle-bar 13. Crank-handles 18 are secured on the ends of the driving-shaft 17 and oppositely project therefrom, as clearly shown in Figs. 1 and 2.

A swivel-block 19 is pivotally attached to the upper end of the handle-bar 13, which block is transversely apertured for the reception of a strap 20, that is adapted to be buckled around the body of the person operating the implement, thereby permitting the operator to progressively move the clipping-machine, with his hands free to manipulate the crank-handles 18.

At the forward end of the driven shaft 14, which is near the cutter-frame 10, a short shaft extension $14^a$ is loosely secured thereto, preferably by the formation of two close ring-eyes $d$ on adjacent ends of said shaft-sections, which eyes are interlocked, as shown in Figs. 2 and 3, thus affording a universal-joint connection between the parts 14 $14^a$.

It is essential that the forked cutter-frame 10 be so secured upon the handle-bar 13 that said head-frame may be given different angular adjustments upon the handle-bar, so that while the frame rests substantially level on the ground or sward the upper extremity of the handle-bar may be rendered higher or lower to suit the height of the person using the machine. To this end two parallel flanges $e$ are formed on the normally lower side of the handle-bar 10 at its forward end. Between these spaced flanges the shank $a$ of the cutter-head frame is adjustably secured by two transverse bolts $e'$, the forward one acting as a fulcrum and the adjustment being secured by making the holes for the rear bolt through the flanges $e$, as slots $e^2$, which permit vertical adjustment of the bolt therein.

It will be seen that if the nuts on the ends of the bolts $e'$ are slackened the cutter-head frame 10 may be rocked into a desired position of angular adjustment with regard to the handle-bar 13 and then be secured by a clamping adjustment of the nuts on the bolts $e'$, that slightly spring the flanges $e$ toward the sides of the shank $a$, so as to frictionally hold the latter.

On the upper side of the cutter-head frame 10 a bracket-box 21 is secured behind the cutter-bar 11, and an upright flange $11^a$ may be formed on the rear edge of said cutter-bar to be bolted upon the rear face of the bracket-box named and afford support thereto. The shaft extension $14^a$ is journaled in the bracket-box 21, and thus adapted for free rotation, a small heavy balance-wheel 22 being placed upon and secured to the shaft extension. The forward extremity of the shaft extension $14^a$ projects in advance of the box 21, and a crank-arm $g$ is thereon secured. On the cutter-blade 12, near one side edge of the same, a bracket-block $h$ is secured, which block is perforated in a line parallel with that of the driven shaft 14. A link-bar $i$ has one end pivoted in the perforation of the block $h$ and its opposite end laterally perforated to loosely engage with a pivot-pin that projects forwardly from the outer end of the crank-arm $g$. The relative proportion of parts is such as will enable the driven shaft 14 and its extension $14^a$ to reciprocate the cutter-blade 12.

The provision of the universal joint $d$ $d$ between the shaft 14 and the shaft extension $14^a$ enables an unobstructed revolution of the shaft extension when it is disposed slightly out of axial alinement with the driven shaft 14, which will result from a change in angular adjustment of the cutter-head frame 10 on the handle-bar 13.

When the grass-clipping device that has been described is to be used for cutting the grass closely to the ground, then the device may be slid on the furcated members of the cutter-head frame 10. In case it is preferred to do so, small caster-wheels 23 may be clamped upon the frame fork members, as shown in Figs. 2 and 3, which will allow a greater distance to intervene between the sward and the reciprocating cutter-blade 12, and also permit the handle-bar to be raised a greater degree at its end that is connected with the person who operates the machine.

It is at times desirable to afford the cutter-head frame 10 lateral adjustment on the handle-bar 13, so that the clipping device may be conveniently operated to cut grass on an incline from a horizontal plane. To readily effect such an adjustment of parts, the attachment shown in Fig. 2 is provided, comprising a spring detent-finger 24, that has its free end bent to produce a locking-toe thereon. Said finger has its end portion that is opposite from the locking-toe secured upon the side of the tubular handle-section that is immediately behind the bar-section which supports the driving-shaft 17 and that is screwed to the adjacent handle-bar section.

A row of spaced perforations $k$ is formed in the wall of the handle-bar section that carries the shaft 17, and said perforations are spirally disposed to conform with the pitch of the screw-threads that connect this bar-section with the one forward of it.

It will be seen that by slightly unscrewing the threaded connection between the handle-bar sections mentioned until a proper lateral inclination of the cutter-head frame 10 is effected and then engaging the toe of the detent-finger 24 with the perforation $k$ it comes opposite the threaded connection of the handle-bar sections will be held against a change of screwed adjustment until this is designedly effected in an obvious manner.

In Figs. 6 and 7 the handle-bar $13^a$ for the clipping device is shown somewhat changed in construction and comprises an elongated billet of wood or metal, which is channeled to reduce its weight. At the forward end of the handle-bar $13^a$, which is made rectangular in cross-section, the cutter-head frame members $10^a$, that are separately formed, are secured, and each one is downwardly and forwardly bent to give said members the form of fork-tines. The rear end portions $m$ of the frame members $10^a$ are laterally bent where they extend from the forward portions thereof and are flattened on the sides that are nearest to each other in service. Depending ears may be formed on the rear ends of the portions $m$, and said ears be slotted, as is clearly shown in Fig. 7. The frame members $10^a$ are clamped upon the sides of the handle-bar $13^a$ at its forward end by the pair of bolts $c'$, having nuts thereon, and one of the bolts passes through alined perforations in the rear end portions $m$ of the frame members $10^a$, forwardly of the slots therein, thus affording a fulcrum for the rocking adjustment of the frame members on the handle-bar. The other clamping-bolt $e'$ is inserted through a perforation of the handle-bar which is opposite the slots in the end portions $m$ of the frame members $10^a$ and enables an angular adjustment of the frame fork members $10^a$ upon the handle-bar $13^a$, for the purpose hereinbefore explained.

The driven shaft 14 and forward shaft extension 14ª are like the same parts in Figs. 1 to 5 that have been described, as are other details of the grass-cutting device, the modification being mainly provided to enable the use of wood as a material for the formation of the handle-bar.

The balance-wheel 22 serves to equalize the reciprocatory movement of the cutter-blade 12 and renders the cutting operation easier when heavy bunches of grass are encountered while the machine is in use.

In operation it will be seen that the person using the implement can with ease and celerity clip growing grass that is along the inclined borders of the beds, also around trees and shrubbery, as well as in the corners of grass-plots, which cannot be cut with a lawn-mower and that is usually clipped with hand-shears.

Having thus described my invention, I claim as new and desire to secure by Letters Patent—

1. A grass-cutting device, comprising cutting and operating mechanisms, a guiding-handle formed in two parts screw-threaded on each other, each part having one of said mechanisms attached thereto, and an arm mounted upon one part having a locking-pin thereon, the adjacent end of the other part having a series of holes arranged on a spiral corresponding to the thread of the connection and adapted to receive said locking-pin, substantially as described.

2. A grass-cutting device, comprising a reciprocating cutter-bar, a frame for the cutting mechanism, a joint of the operating-shaft mounted thereon and provided with a fly-wheel, a controlling-handle secured thereto so as to be adjustable in a vertical angle, an operating mechanism mounted on the handle above the said adjustable connection, and a power connection therefrom to the fly-wheel shaft by a universal or tumbling joint, substantially as described.

3. In a grass-clipping implement, of the character described, the tubular handle-bar composed of sections that are joined together by threaded connections, two sections being adjustably held at a desired point of rotatable adjustment by a detent-finger secured on one handle-bar section, and having a toe that may engage with any one of a series of perforations formed in the other handle-bar section, substantially as described.

JOHN McCALLUM.

Witnesses:
FREDERICK T. CONDIT,
PETER P. BERGERON.